Inventor
John R. Densham
By Lawrence J. Winter
Attorney

Nov. 8, 1966  J. R. DENSHAM  3,283,612
POWER TRANSMISSION SYSTEMS
Filed July 2, 1963  6 Sheets-Sheet 2

Inventor
John R. Densham
By Lawrence J. Winter
Attorney

United States Patent Office 3,283,612
Patented Nov. 8, 1966

3,283,612
POWER TRANSMISSION SYSTEMS
John R. Densham, Leamington Spa, England, assignor to Automotive Products Company Limited, Leamington Spa, England
Filed July 2, 1963, Ser. No. 292,356
Claims priority, application Great Britain, July 4, 1962, 25,581/62
8 Claims. (Cl. 74—687)

This invention relates to power transmission systems providing variable speed ratios, such as are used to transmit the drive from the engine of a vehicle to the road wheels. The invention has for its object to provide a transmission system which is efficient in operation and provides a continuous variation of the speed ratio between certain limits.

According to the invention, a power transmission system comprises a single planetary gear train one element of which is driven directly by an input shaft and another element of which is coupled to the input shaft by a liquid pressure pump and motor combination providing a variable speed ratio, the third element of the gear train being coupled to an output shaft.

Further, according to the invention a power transmission system comprises an input shaft to which are directly coupled a sun wheel and the body of a radial cylinder liquid pump; an annular member rotatable about the input shaft and including a gear annulus, a track ring of eccentric or cam form acted on by pistons in the pump cylinders, and the body of a radial cylinder liquid pressure motor; a track ring engaged by pistons in the motor cylinders and movable to vary its eccentricity relative to the motor body; and an output shaft carrying a planet carrier on which are mounted planet pinions meshing with the sun wheel and gear annulus, the pump being arranged to supply liquid to the liquid pressure motor to rotate the annular member at a speed relative to that of the input shaft which varies with the eccentricity of the motor track ring and so enables the speed of the output shaft relative to the speed of the input shaft to be varied.

Preferably the track ring engaging the pistons in the motor cylinders is rotatably mounted in slidable bearing supports movable in planes perpendicular to the axis of the input shaft.

A valve may be provided to control the flow of liquid in the pump and motor, said valve having three operative positions in one of which the pump inlet and outlet and the motor inlet and outlet are all coupled one to another, in another of which the inlet and outlet of the motor are closed and the inlet and outlet of the pump are connected one to the other, and in the third of which the inlet and outlet of the pump are connected respectively to the outlet and inlet of the motor.

Figure 1:
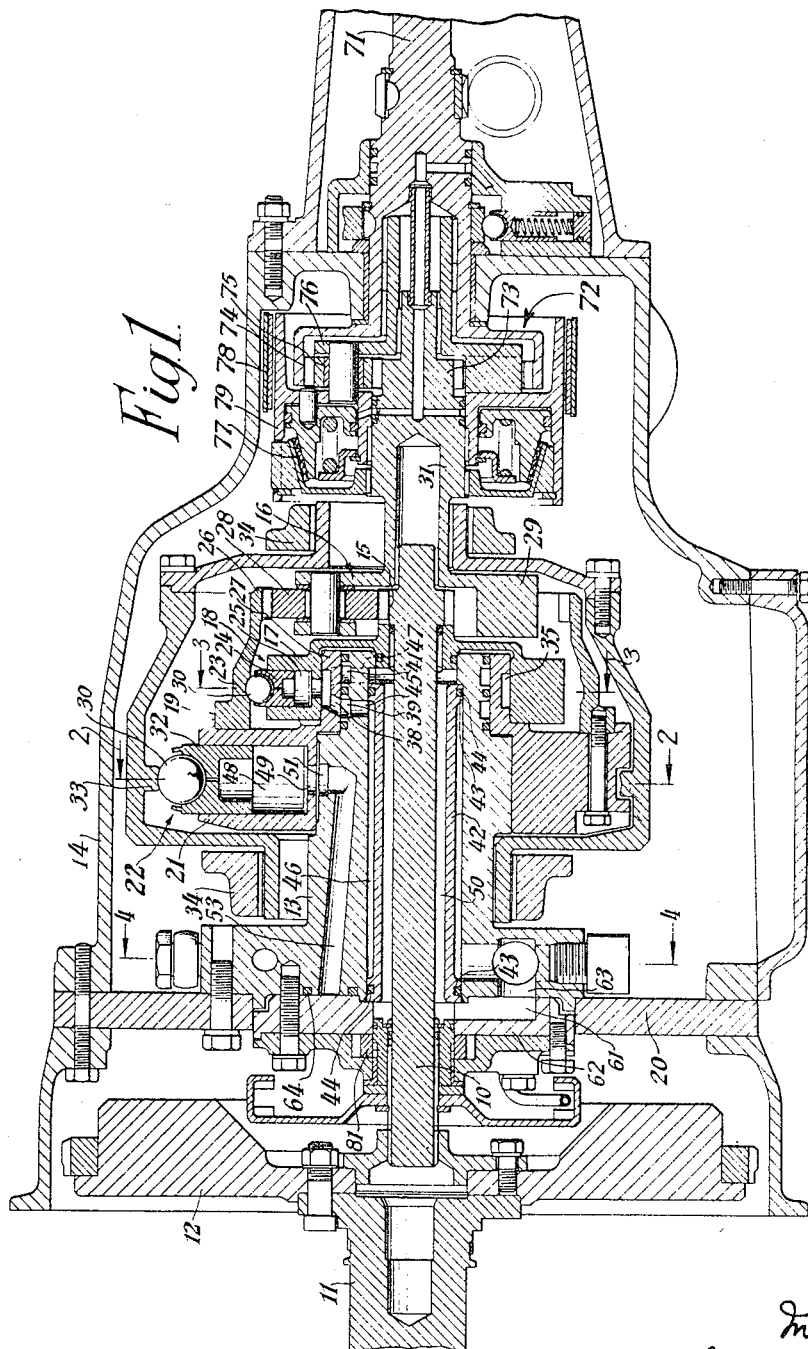
Figure 2:
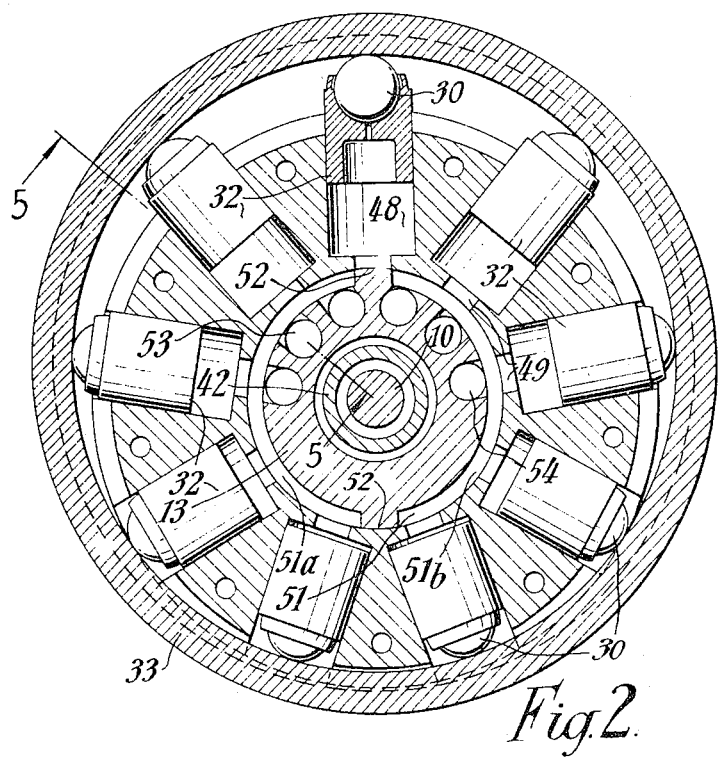
Figure 3:
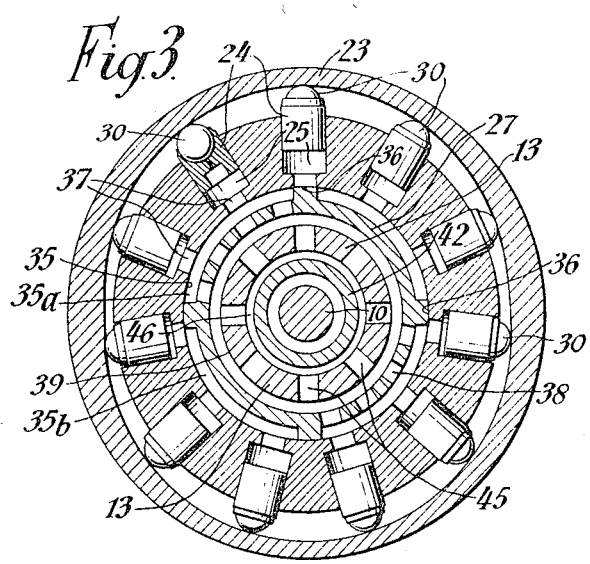
Figure 4:
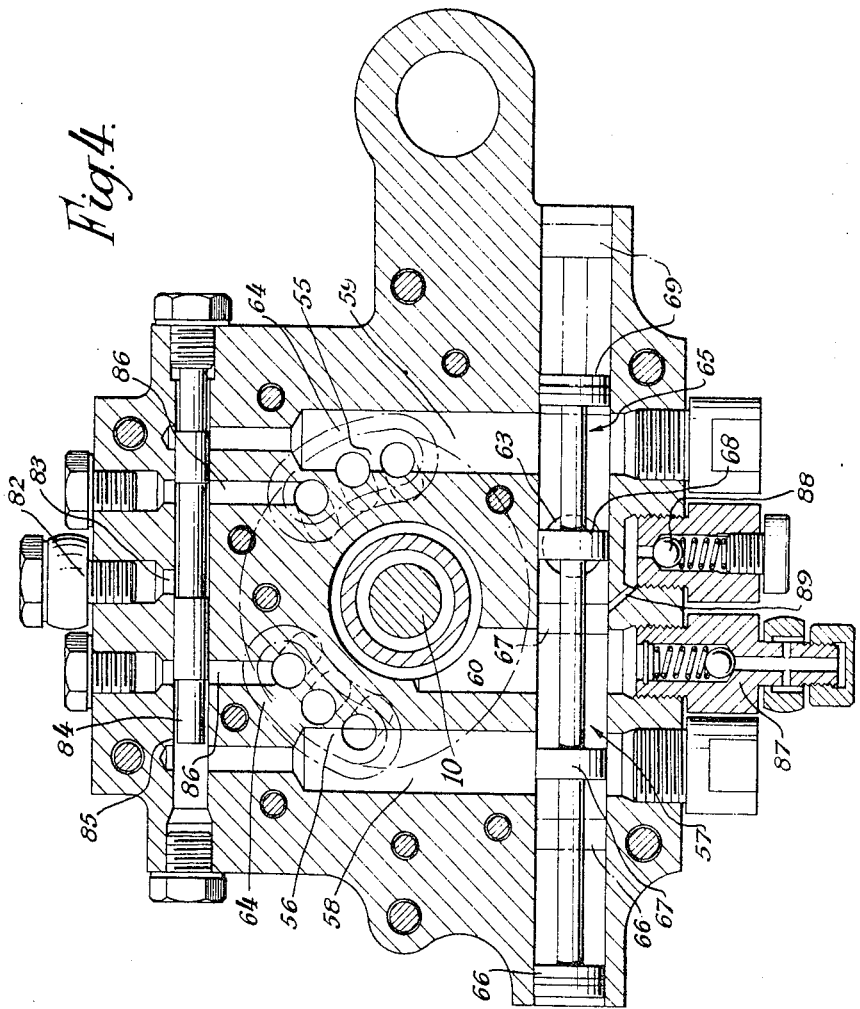
Figure 5:
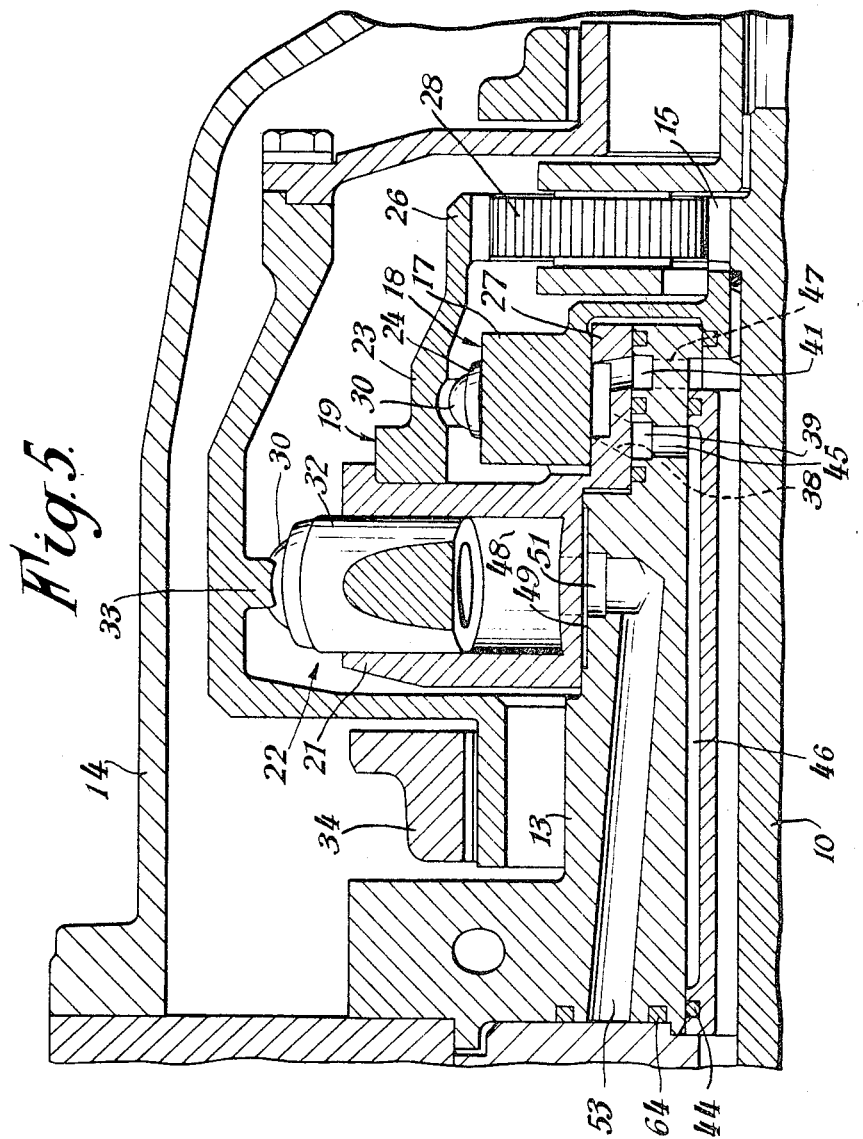
Figure 6:
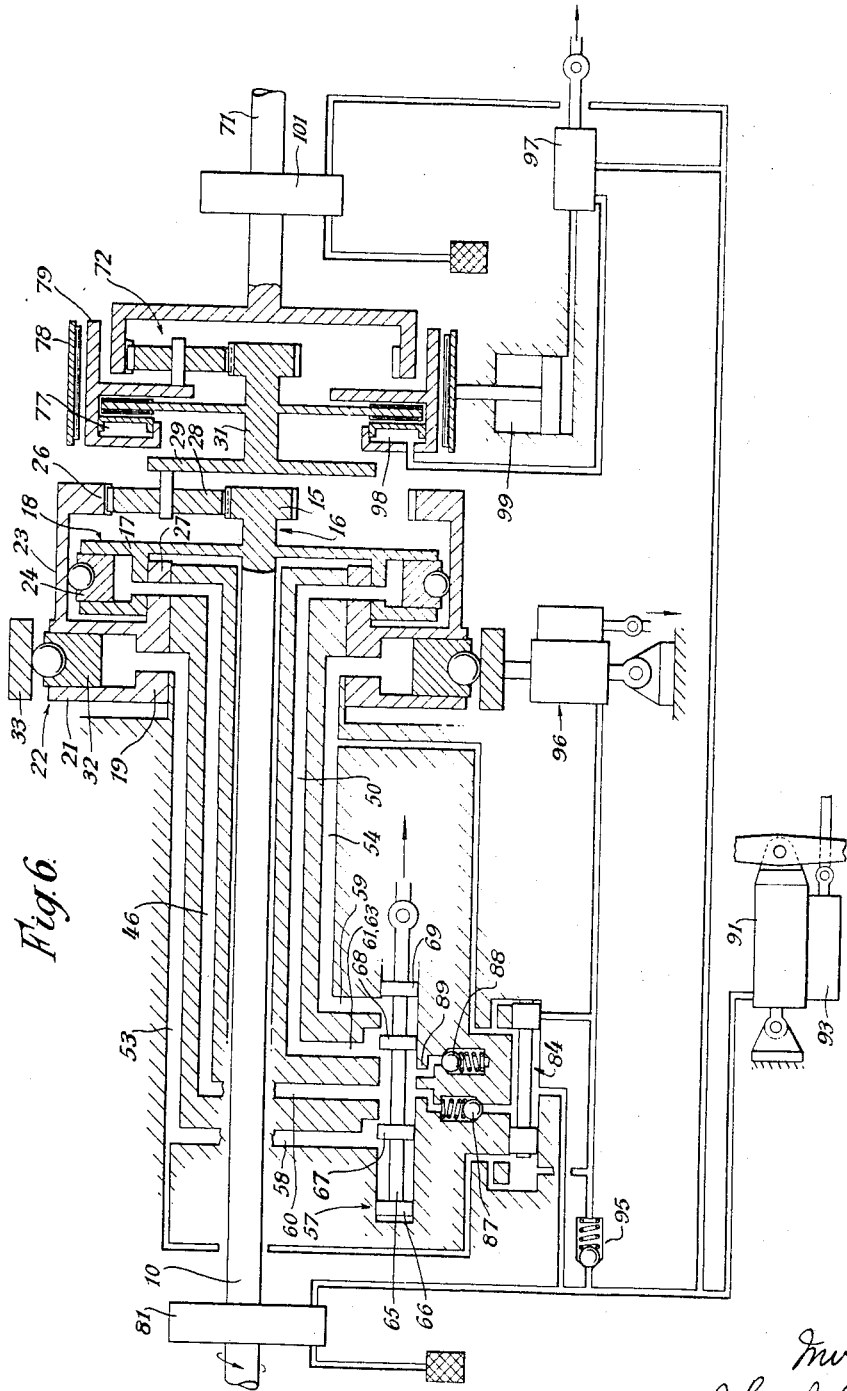
Figure 7:
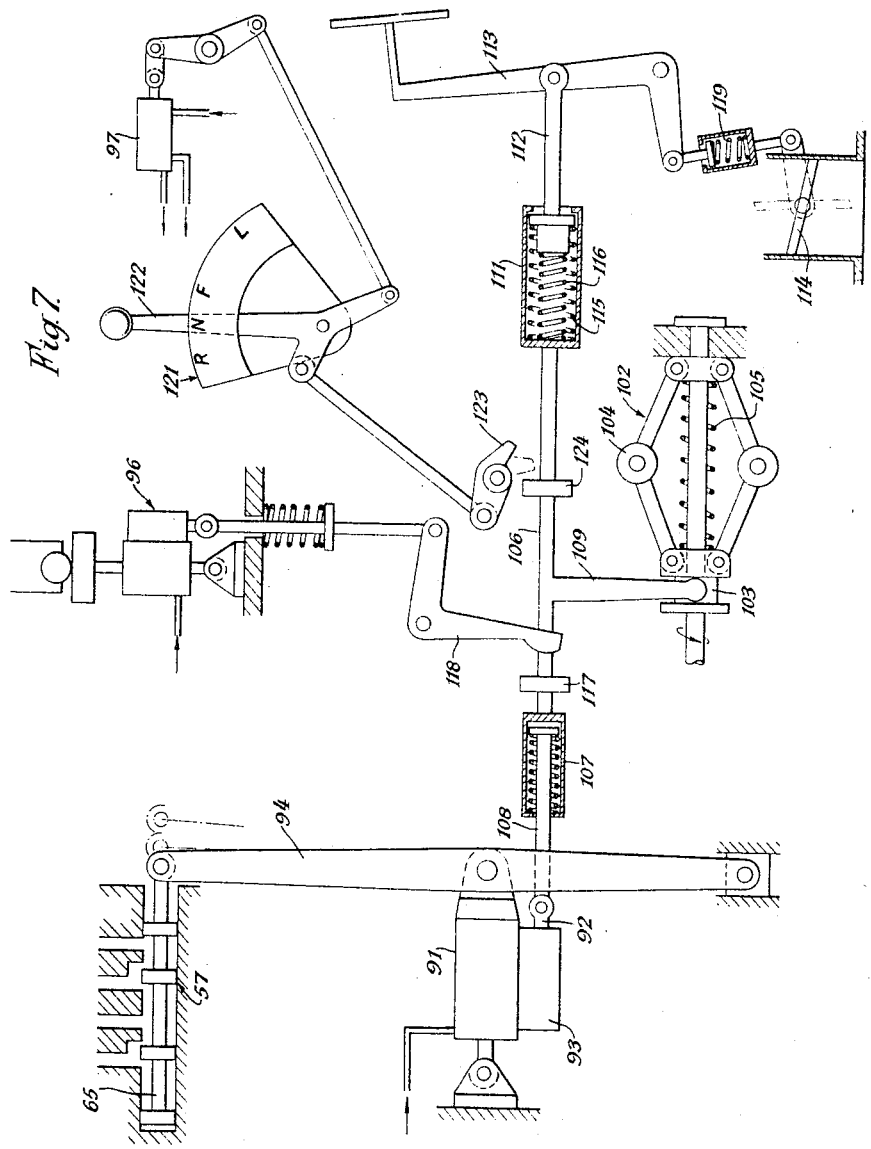

The invention is hereinafter described with reference to the accompanying drawings, in which:

FIGURE 1 is a longitudinal section through one form of power transmission system according to the invention;
FIGURE 2 is a transverse section on the line 2—2 of FIGURE 1;
FIGURE 3 is a transverse section on the line 3—3 of FIGURE 1;
FIGURE 4 is a transverse section on the line 4—4 of FIGURE 1;
FIGURE 5 is a composite section, approximately on the line 5—5 of FIGURE 2, showing the liquid pressure connections between the pump, motor and valve, the pump body 17 and motor cylinder block 21 having been rotated slightly from the positions in which they are shown in the other figures to bring the axes of the cylinders into the section plane;
FIGURE 6 is a diagram showing the liquid pressure circuit of the transmission system; and
FIGURE 7 is a diagram of the control apparatus for the transmission system.

Referring to FIGURES 1 to 5 of the drawings, an input shaft 10 shown as being directly coupled to the crankshaft 11 of an internal combustion engine on which is mounted a flywheel 12, extends through a sleeve 13 projecting axially from a transverse partition 20 in a gear casing 14. The input shaft 10 has fixedly mounted on it a sun wheel 15 of a planetary gear train 16, and also the cylinder block 17 of a radial cylinder liquid pump 18. An annular member 19 rotatably mounted on the sleeve 13 comprises the cylinder block 21 of a radial-cylinder liquid pressure motor 22, a track ring 23 surrounding the pump cylinder block 17 and engaging the outer ends of pump pistons 24 fitted in the cylinders 25 of the cylinder block 17, a gear annulus 26 surrounding the sun wheel 15, and a cylindrical flange 27 extending between the sleeve 13 and the pump cylinder block 17. The track ring 23 is of substantially elliptical shape, as shown in FIGURE 3, so that, during each revolution thereof relative to the pump body 17, the pistons 24 make two in-and-out movements. Planet gears 28, mounted on a planet carrier 29 carried by an output shaft 31 co-axial with the input shaft 10 mesh with both the sun wheel 15 and the gear annulus 26.

The pistons 32 of the liquid pressure motor 22 abut at their outer ends on a circular track ring 33 freely rotatable in bearings 34 and movable bodily along a line diametral to the input shaft 10 to vary the eccentricity of the said track ring 33 relative to the motor cylinder block 21 between zero and a maximum. The pump pistons 24 and the motor pistons 32 carry balls 30 to engage the track rings, the balls being rotatable relative to the pistons.

The cylindrical flange 27 is formed with an external circumferential groove 35, interrupted at four equally spaced points by lands 36 as shown in FIGURE 3, and the pump cylinders 25 have ports 37 at their inner ends opening into the said groove. Two opposite segments 35a of the groove 35 are connected by substantially radial passages 38 to one of two circumferential grooves 39, 41 in the outer peripheral surface of the sleeve 13, the other two opposite segments 35b being connected by similar radial passages to the other of said grooves. The bore of the sleeve 13 has a diameter substantially larger than that of the input shaft 10, and a tube 42 having external peripheral ribs 43 at its ends, is fitted within the said sleeve, the ribs 43, which are grooved to receive packing rings 44, making a fluid-tight joint with the bore of the sleeve. The groove 39 is connected by radial passages 45 in the sleeve to the annular space 46 around the tube, and the groove 41 is connected by corresponding passages 47 to the space 50 around the input shaft 10. The spaces 46 and 50 are represented as passages bearing those numbers in the diagram of FIGURE 6.

The motor pistons 32 are reciprocable in cylinders 48 in the cylinder block 21, the said cylinders 48 being connected by passages 49 at their inner ends to a circumferential groove 51 in the outer periphery of the sleeve 13. The groove 51, as shown in FIGURE 2, is divided by lands 52 into two semi-circular sections 51a and 51b, the said section being connected respectively by groups of longitudinal passages 53 and 54 in the sleeve 13 to each of two arcuate recesses 55 and 56 formed in the face of the partition 20 opposite the sleeve 13.

Interconnection of the passages 53 and 54 leading into the recesses 55 and 56, the annular space 46, and the annular space 50 is controlled by a slide valve 57 (FIGURES 1 and 4) mounted in a bore, chordal with respect to a circle about the axis of the input shaft 10, in the sleeve 13. Passages 58 and 59 in the sleeve connect the recesses 55 and 56 respectively to the valve bore, a passage 60 in the said sleeve connects the annular space 46 to the said bore, and a recess 61 in a plate 62 clamped against the face of the sleeve 13 connects the space 50 around the input shaft 10 to a port 63 opening into the valve bore. The passage 60 and the port 63 open into the valve bore between the positions at which it is connected to the passages 58 and 59. The plate 62 also serves to close the recesses 55 and 56, packings being provided in grooves 64 around the said recesses which engage the surface of the plate 62 to make a fluid-tight joint. The plunger 65 of the slide valve 57 is formed with four axially spaced lands 66, 67, 68 and 69, as shown in FIGURE 4. The plunger 65 is movable from one extreme position, in which it is shown in the full lines in FIGURE 4, to another extreme position, in which it is shown in dotted lines in FIGURE 4. In the full-line position of the slide valve passages 58, 59 and 60, and the port 63, are all freely in communication with each other, and the pump circulates liquid idly in the liquid pressure system, whilst the motor cylinder block can rotate idly. Thus no torque can be transmitted.

If the valve plunger 65 is moved until the lands 67 and 68 lie respectively between the passages 58 and 60 and between the port 63 and the passage 59, the passages 58 and 59 are both shut off at the valve so that the motor 22 is locked against movement, whereas the pump is free to operate idly, since the passage 60 and the port 63 are in communication through the space between the lands 67 and 68.

If the valve plunger 65 is moved further, to its dotted line position, the passages 58 and 60 are connected one to the other through the space between the lands 66 and 67, and the port 63 and passage 59 are connected one to the other through the space between the lands 68 and 69, so that the pump 18 delivers liquid to the motor 22, and the relative speed of rotation of the pump body 17 and the motor cylinder block 21 depends on the eccentricity of the track ring 33.

With the valve plunger 65 in the intermediate position, the motor body 21 is held against rotation by the hydraulic locking of the motor (assuming the track ring 33 to be in an eccentric position), so that the gear annulus 26 is also held, and the planet pinions 28 are caused to roll round it by the rotation of the sun wheel 15, giving a fixed gear ratio. When the valve plunger 65 is moved to the dotted-line position shown in FIGURE 5 the gear annulus 26 commences to rotate in the same direction as the sun wheel 15, its rate of rotation being increased relative to that of the sun wheel as the eccentricity of the track ring 33 is decreased, until, when the track ring 33 becomes concentric with the motor body the two rotate at the same speed and a direct drive is achieved. Thus, by arranging for the track ring 33 to move from a position of maximum eccentricity to a concentric position a continuous variation of gear ratio is achieved.

The output shaft 31 is coupled to a final drive shaft 71 by means of a reversing gear 72 comprising a sun wheel 73 fixed on the output shaft 31, a gear annulus 74 fixed on the final drive shaft 71, and planet pinions 75 mounted on a planet carrier 76 and meshing with both the sun wheel and the gear annulus. A clutch 77 is provided to couple the planet carrier 76 to the output shaft 31, thus locking the reversing gear elements together for forward drive, and a brake pad 78 acts on a drum 79 on the planet carrier to hold the latter against rotation, thereby providing reverse drive.

A gear pump 81, driven by the input shaft 10, maintains the pump/motor circuit full of liquid, the pump being arranged to draw oil from a suitable reservoir, for example in the lower part of the gear casing 14. The gear pump 81 is connected at 82 to a passage 83 in the sleeve 13, and a slide valve 84 in a bore 85 in the said partition connects the said passage 83 selectively to passages 86 leading into the two recesses 55 and 56 respectively, the slide valve being moved by pressure in either of the passages 58, 59 to connect the passage 83 to the recess to which the other of said passages 58, 59 is connected. The gear pump 81 is also connected through a non-return valve 87 to the passage 60 to supply liquid direct to the pump 18, and a relief valve 88, the passage 89 leading to which is closed by the land 67 of the slide valve 65 when the pump and motor are connected, prevents excessive pressures being built up due to the pulsations of the piston type pump and motor.

The slide valve 57, as shown in FIGURE 7, is operated by a liquid pressure servo-motor 91 receiving liquid under pressure from the pump 81, the servo-motor 91 being of the follow-up type in which movement of the plunger 92 of a servo-control valve 93 results in movement of the servo-motor cylinder and the body of the said servo-control valve to restore the said plunger 92 to its initial position relative to the body of the valve.

The servo-motor 91 actuates the plunger 65 of the slide valve 57 through a lever 94, the servo-control valve 93 being controlled in a manner hereinafter described.

Referring to FIGURE 6, the pump 81 is also connected, through a non-return valve 95, to another servo-motor unit 96 similar to the servo-motor 91 and its control valve 93, the servo-motor unit 96 acting to move the track ring 33 so as to vary its eccentricity. The pump 81 is also connected, through a selector valve 97 of any suitable form, to motor cylinders 98 and 99 acting respectively to engage the clutch 77 and the brake 78 of the reversing gear train. The clutch 77 although it is shown as a cone clutch in FIGURE 1, is shown diagrammatically as a plate clutch in FIGURE 6.

An additional pump 101, shown only in the diagram of FIGURE 6, is driven by the output shaft 71 and so enables liquid to be supplied to the transmission by towing the vehicle. The engine crankshaft can thus be rotated by towing the vehicle to enable the engine to be started in that way.

Referring to FIGURE 7, a centrifugal governor 102 driven by the engine of the vehicle in which the transmission is mounted includes a collar 103 caused by outward movement of the governor weights 104 with increasing engine speed to compress a spring 105. A rod 106 connected by a spring box 107 to another rod 108 coupled to the plunger 92 of the servo-control valve 93 has mounted on it an arm 109 engaging a groove in the collar 103. The rod 106 is connected by another spring box 111 to a further rod 112 coupled to the accelerator pedal 113 for controlling the throttle valve 114 of the vehicle engine. The spring box 111 has mounted in it two springs 115 and 116, the spring 116 coming into operation only when the spring 115 is partially compressed.

When the engine is idling, the springs 105 and 115 together exert a force sufficient to prevent the governor weights from moving outwardly, and the servo-motor 91 holds the slide valve 57 in the position shown in full lines in FIGURE 5, so that theliquid circulates idly in the pump and motor and no torque is transmitted.

Increase in the engine speed causes the governor weights 104 to swing outwardly, moving the rod 106 towards the right in FIGURE 7 to move the plunger of the slide valve 57 first to the intermediate position in which the motor body is held against rotation and the transmission provides a fixed gear reduction, and finally to the position shown in chain-dotted lines in FIGURE 5, in which the pump 18 drives the motor 22 at a relative speed depending on the eccentricity of the track ring 33.

The track ring 33 is normally held by the servo-motor unit 96 in the position of maximum eccentricity but, when the rod 106 has moved to the position last referred to, a collar 117 thereon engages one arm of a bell-crank lever 118 the other arm of which is linked to the control valve of the servo-motor unit 96, and further movement of the rod 106 operates the servo-motor to move the track ring towards its position of minimum eccentricity and provide a direct drive. The spring box 107 allows the further movement of the rod 106 after the plunger 92 of the servo-control valve 93 has completed its movement.

It will be apparent that as the accelerator pedal 113 is depressed to increase the throttle opening, the spring 115 will be compressed and will increase the resistance to movement of the rod 106 by the centrifugal governor. The variation in throttle opening to produce a given speed is a measure of the resistance to travel of the vehicle, and the transmission ratio is thus dependent to some degree on engine loading as well as speed.

The accelerator pedal 113 is connected to the throttle valve 114 through a spring box 119 which allows further depression of the pedal 113 after the throttle valve is fully open, and such further depression compresses the spring 116 adding further spring resistance to the action of the centrifugal governor which tends to displace the rod 106 to the left and displace the track ring 33 from its concentric position. The track ring tends to take up a position such that the engine speed is at a maximum and full power is developed, the governor preventing the engine from exceeding a predetermined maximum speed.

A manual control 121 is provided for the selector valve 97, comprising a lever 122 movable over a quadrant and coupled both to the selector valve 97 and to a stop arm 123 movable into the path of a collar 124 on the rod 106. The lever 122 has the following positions:

NEUTRAL  (N)
    FORWARD  (F)
    LOW GEAR HOLD  (L)
    REVERSE  (R)

The lever 122 is shown in the "N" position in FIGURE 7, and in that position both the clutch 77 and the brake 78 are disengaged, and the stop arm 123 is out of the path of the collar 124. Movement of the lever 122 to the "F" position engages the clutch 77 to provide forward drive, and further movement to the "L" position brings the stop arm 123 into the path of the collar 124 to prevent the rod 106 from moving to shift the valve plunger 92 of the servo-motor 91 beyond that which corresponds to the intermediate position of the slide valve 57.

Movement of the lever 122 in the opposite direction from the "N" position, to the "R" position, engages the brake 78 to cause reverse rotation of the driven shaft 71.

The above description of a control mechanism for the transmission system is given purely by way of example, and other forms of control system may be provided. Manual control may be provided if desired.

The operation of the unit can be divided into two parts referred to as follows:

(1) The mechanical low gear.
(2) The hydro-mechanical variable gear.

The input shaft is coupled to a power unit, and when the gearbox is in "neutral" and the power unit idling, the pump and motor hydraulic circuits are interconnected so that oil is allowed to circulate but no drive is transmitted to the output shaft.

The output shaft is stationary, and so the annulus rotates backwards slowly and the pump and motor are therefore operating.

The mechanical low gear is obtained from rest by slowly closing a valve controlling the motor on the output side. By doing this the motor and annulus assembly is slowly brought to rest, and so power is gradually given to the output shaft until, with the annulus stationary, the full power from the input shaft is transmitted mechanically to the output shaft and the torque reaction on the annulus is absorbed by the hydraulically locked motor. The pump is circulating oil within its own circuit and not transmitting any power. In this condition the engine speed is directly related to output speed and the vehicle speed can be altered by varying engine speed as in a normal geared transmission.

The hydro-mechanical variable gear is obtained by hydraulically coupling the pump to the motor through a suitable valve. The pump transmits a part of the input power to the annulus and the remainder is transmitted directly to the sun wheel. The ratio of sun wheel to annulus controls the percentage split of the input torque. The lowest ratio obtainable is limited by the ratio of the swept volumes of the pump and the motor, the motor eccentric being set to give maximum stroke. The highest ratio is direct drive (1:1) and is obtained when the motor eccentric is set to give zero stroke to the motor pistons. The pump, which is always on full stroke, is therefore locked hydraulically and so the pump body, motor body and annulus rotate together. The sun and annulus rotating together lock the input and output shafts in a 1:1 drive. Any ratio between these two limits can be obtained by adjusting the position of the motor eccentric ring.

This particular arrangement of pump and motor units has the advantage that hydraulic losses are reduced and also the speeds of the hydraulic units are maintained as low as possible. Accordingly in the low mechanical gear the pump is unloaded and circulates oil only and so absorbs little or no power. The motor is stationary and hydraulically locked by means of a valve. A high mechanical efficiency is therefore obtained.

In the hydro-mechanical variable drive the pumping speed of the pump decreases as the motor body and annulus speed increases, until when 1:1 drive is obtained the pumping speed is zero, although the pump body is rotating at input shaft speed.

Torque is transmitted to the pump body, and the reaction to pumping is taken by the action of the pistons moving round the pump eccentric. This torque is therefore transmitted mechanically from the pump body via the pistons and pump eccentric to the annulus and in so doing helps to reduce the hydrostatic share of the power being transmitted. The amount of power transmitted by reaction increases as the transmission ratio moves towards 1:1 drive.

In 1:1 drive the pump is locked hydraulically and torque from the input shaft is therefore transmitted solely by this reaction drive to the annulus.

In the 1:1 drive the motor is on zero stroke and so, although the motor is rotating at input shaft speed, the pistons are static relative to their cylinders. Frictional losses from the motor pistons and also the pump pistons will therefore be zero. As the pump is always rotating faster than the pump eccentric (except in 1:1 drive, when speeds are equal), any friction between pump pistons and eccentric will help to transmit power.

I claim:

1. A power transmission system comprising an input shaft, an output shaft, a planetary gear train including a sun wheel directly coupled to said input shaft, a gear annulus and planet gears, a liquid pressure pump and motor providing a variable speed ratio said liquid pressure pump comprising a body element and an impeller driving element, one of said elements being directly coupled to the input shaft and the other of said elements being directly coupled to the gear annulus, said gear annulus being coupled to said input shaft by said pump and motor, said planet gears being disposed to mesh with said sun wheel and annulus, and a planet carrier upon which said planet gears are mounted, said carrier being directly coupled to said output shaft.

2. The power transmission system of claim 1 wherein means are provided for hydraulically locking the motor and idling the pump to mechanically drive the output shaft by the input shaft.

3. A power transmission system comprising an input shaft to which are directly coupled a sun wheel and the body of a radial cylinder liquid pump; an annular member rotatable about the input shaft and including a gear annulus, a track ring of eccentric or cam form acted on by pistons in the pump cylinders, and the body of a radial cylinder liquid pressure motor; a track ring engaged by pistons in the motor cylinders and movable to vary its eccentricity relative to the motor body; and an output shaft carrying a planet carrier on which are mounted planet pinions meshing with the sun wheel and gear annulus, the pump being arranged to supply liquid to the liquid pressure motor to rotate the annular member at a speed relative to that of the input shaft which varies with the eccentricity of the motor track ring and so enables the speed of the output shaft relative to the speed of the input shaft to be varied.

4. A power transmission system according to claim 3, wherein the track ring engaging the pistons in the motor cylinders is rotatably mounted in bearing supports movable in planes perpendicular to the axis of the input shaft.

5. A power transmission system according to claim 3, wherein valve means are provided to control the flow of liquid in the pump and motor, said valve means having one position in which the pump inlet and outlet and the motor inlet and outlet are all coupled one to another, a second position in which the inlet and outlet of the motor are closed and the inlet and outlet of the pump are connected one to the other, and a third position in which the inlet and outlet of the pump are connected respectively to the outlet and inlet of the motor.

6. The system of claim 5 wherein a prime mover means is provided and said valve means is operatively connected thereto to respond to changes in the speed of said prime mover.

7. A power transmission system according to claim 6, wherein a track ring engaging the pistons in the motor cylinders is operatively connected to respond to changes in speed of the prime mover means, for movement from a position of maximum eccentricity towards a concentric position when the valve means is moved to its third position.

8. A power transmission system according to claim 7 wherein a reversing gear train means is provided between the output shaft and a driven shaft to enable said driven shaft to be rotated in either direction by unidirectional rotation of the output shaft.

References Cited by the Examiner

UNITED STATES PATENTS

| | | | |
|---|---|---|---|
| 2,517,188 | 8/1950 | Feng | 74—687 |
| 2,901,922 | 9/1959 | Baker | 74—687 |
| 2,924,123 | 2/1960 | Giles | 74—687 |
| 2,931,250 | 4/1960 | Ebert | 74—687 |
| 2,939,342 | 6/1960 | Woydt et al. | 74—687 |

FOREIGN PATENTS 692,056   5/1953   Great Britain.

DAVID J. WILLIAMOWSKY, *Primary Examiner.*

DON A. WAITE, *Examiner.*

T. C. PERRY, *Assistant Examiner.*